UNITED STATES PATENT OFFICE.

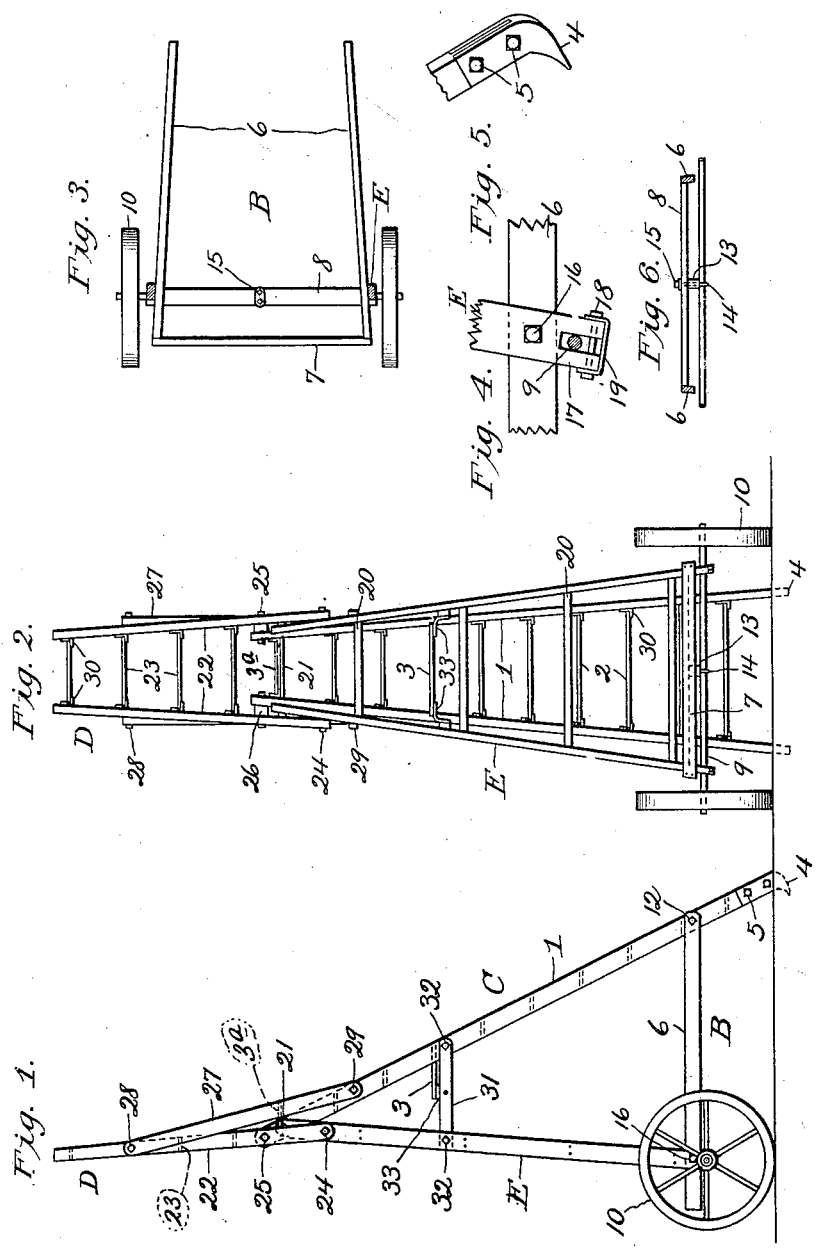

AUGUST C. CHMIDLING AND JOHN W. TINCHER, OF LOWEMONT, KANSAS.

WHEELED LADDER.

1,017,382.

Specification of Letters Patent. Patented Feb. 13, 1912.

Application filed October 4, 1910. Serial No. 585,329.

*To all whom it may concern:*

Be it known that we, AUGUST C. CHMIDLING and JOHN W. TINCHER, citizens of the United States, residing at Lowemont, in the county of Leavenworth and State of Kansas, have invented certain new and useful Improvements in Wheeled Ladders, of which the following is a specification.

Our invention relates to wheeled ladders or scaffold supports, and the object is to provide a wheeled ladder that shall be specially adapted for use in picking fruit from trees and which may be folded compactly for storage or shipping.

In order that the invention may be fully understood, reference is to be had to the accompanying drawings, in which:

Figure 1 is a side elevation of a ladder constructed according to the invention. Fig. 2 is a rear elevation thereof. Fig. 3 is a plan view of the base frame, strut, axle, and wheels. Fig. 4 is a detail view of one of the axle bearings, the axle being shown in section. Fig. 5 is a detail view of one of the spurs. Fig. 6 is a rear elevation of the axle, the superposed strut, and the connecting device thereof.

The principal parts of this ladder are the base frame, designated B; the main ladder section designated C; the top ladder section, designated D; and the main ladder braces, E.

The main ladder section, C, is composed of the rails 1, connected by flat steps or threads 2 and by basket-supports 3 and 3ª, hereinafter described. The lower end of each rail 1 is provided with a metallic spur 4 (one of which is shown in detail in Fig. 5) and said spurs are adapted to sink into the ground as shown in Fig. 1, to prevent the ladder's creeping when in use, especially when resting on inclined ground. The spurs are secured to the rails by bolts 5.

The base frame B is composed of two longitudinal bars 6, a cross-bar 7 connecting their forward ends, and a strut 8 also connecting said bars above the axle, 9, which is provided with large ground-wheels 10. The rear ends of the bars 6 are attached to the rails 1 by bolts 12. The strut 8, by which the frame B is supported, rests at its middle point upon a block 13 which is supported by the axle 9. To fasten the strut yieldingly to the axle and also to hold said block in position, we employ a U bolt 14 which embraces the axle and passes through holes in the block and the strut, being fastened with nuts 15.

The ladder-braces E are secured to the frame-bars 6 by bolts 16, and have downwardly-extending, forked or slotted ends 17, through which the axle passes. These forks or slots constitute guides for holding the axle substantially parallel to the strut 8, though permitting the axle to adjust itself vertically; this being permitted by the yielding character of the bolt-and-block support 13 and 14. When one wheel 10 is on higher ground than the other, the ladder may be set in substantially upright position, as one of the main braces may rest directly upon the axle. Preferably, the braces E are provided with retainer bolts 18 which pass below the axle, and the forked ends are reinforced by U-shaped metal straps 19, held in place by said bolts. The braces E are connected by spaced transverse bars 20. The rails 1 are connected near their upper ends with the upper ends of the braces E, by a long bolt 21.

The top ladder section D is composed of the rails 22 and the steps 23. The lower ends of said rails are secured to the main braces E by bolts 24, and to the upper ends of the main rails 1 by bolts 25. As the upper ends of the rails 1 pass between the braces E, spaces are left between the rails 1 and 22 which spaces are filled by blocks 26, through which the bolts 25 extend. The top ladder section leans slightly forward, and is braced in that position by braces 27 that extend to the main rails 1 and are secured by bolts 28 and 29.

The steps 2 and 23 are made of narrow boards or strips and are secured to the rails by iron brackets 30.

The basket-supports and steps 3 and 3ª, are made sufficiently wide to support a large basket, and extend forwardly as shown. To support the inner end of step 3, a pair of braces 31 are attached to the parts E, 1, by bolts 32, and said braces carry small brackets 33 which underlie the forward corners of the support 3.

To use this ladder in picking fruit, a basket is placed upon either the support 3 or 3ª and the fruit is dropped thereinto. When ready to shift the ladder, the operator lifts the rails 1, disengaging the spurs 4 from the ground, and using the rails as handles, pushes or pulls the ladder to desired position, this being made easy by the wheels.

Two of these ladders may be used in combination for supporting horizontal planks, upon which men may stand in building or repairing work.

When one of these ladders is to be packed for shipment or storage, it may be dismembered as follows: The top ladder section D and its braces 27 are removed by removing the bolts 24, 25, 28, and 29. The short braces 31 are removed by removing the bolts 32. The bolts 12 and 16 are removed next, which permits the base frame B to be detached. The main ladder C is then turned upon bolt 21 as a pivot, and folded against the braces E. In case it is desired to pack the ladder as closely as possible, the wheels may be removed from the axle to that end.

Having thus described our invention, we claim as new, and desire to secure by Letters Patent:

In a wheeled ladder, a base frame, a ladder supporting one end thereof, a pair of ladder braces secured to said ladder and the base frame and projecting below the latter, the lower ends of said braces having longitudinal axle-slots, a wheeled axle passing through said slots, a strut connecting the sides of said frame above the axle, a block supported by the center of the axle and supporting the center of the strut, and pivotal means connecting the block and the axle, whereby the wheels of the axle may accommodate themselves to uneven ground without affecting the stability of the ladder.

In testimony whereof we affix our signatures, in the presence of two witnesses.

AUGUST C. CHMIDLING.
JOHN W. TINCHER.

Witnesses:
F. G. FISCHER,
E. C. LILLIAN.